United States Patent [19]
Mangold

[11] 3,729,233
[45] Apr. 24, 1973

[54] VEHICLE ANTISKID BRAKING SYSTEM

[75] Inventor: James Mangold, Tremblay-les-Gonesse, France

[73] Assignee: Societe Anonyme D.B.A., South Bend, Ind.

[22] Filed: Mar. 10, 1971

[21] Appl. No.: 122,712

[30] Foreign Application Priority Data

Mar. 12, 1970 France ........................ 7008933

[52] U.S. Cl. ........................ 303/21 F, 188/181 A
[51] Int. Cl. ........................ B60t 8/12
[58] Field of Search ........................ 303/21 F, 21 CE, 303/21 CG, 61–63, 68–69, 6 C; 188/181

[56] References Cited

UNITED STATES PATENTS

| | | | |
|---|---|---|---|
| 3,550,966 | 12/1970 | Leiber | 303/21 F |
| 3,574,416 | 4/1971 | Skoyles | 303/21 F |
| 3,494,670 | 2/1970 | Leiber | 303/21 F |

FOREIGN PATENTS OR APPLICATIONS

| | | | |
|---|---|---|---|
| 2,030,385 | 1/1971 | Germany | 303/21 F |
| 1,964,819 | 7/1970 | Germany | 303/21 F |

*Primary Examiner*—Duane A. Reger
*Attorney*—W. N. Antonis and Plante, Hartz, Smith & Thompson

[57] ABSTRACT

This invention relates to an antiskid braking system for automotive vehicles, wherein the fluid supply connection provided between a variable fluid braking pressure control source and a set of fluid pressure actuated brake motors is controlled by fluid pressure modulating valve means actuated by output control signals generated by an antiskid unit in response to a skidding condition of the brake vehicle. The fluid supply connection is provided with a restricted area fluid passage disposed between said fluid source and said modulating valve means so as to substantially limit the fluid flow rate to said brake motors upon opening of said fluid supply connection, and thereby to dampen the build-up in pressure to the brake motors.

3 Claims, 1 Drawing Figure

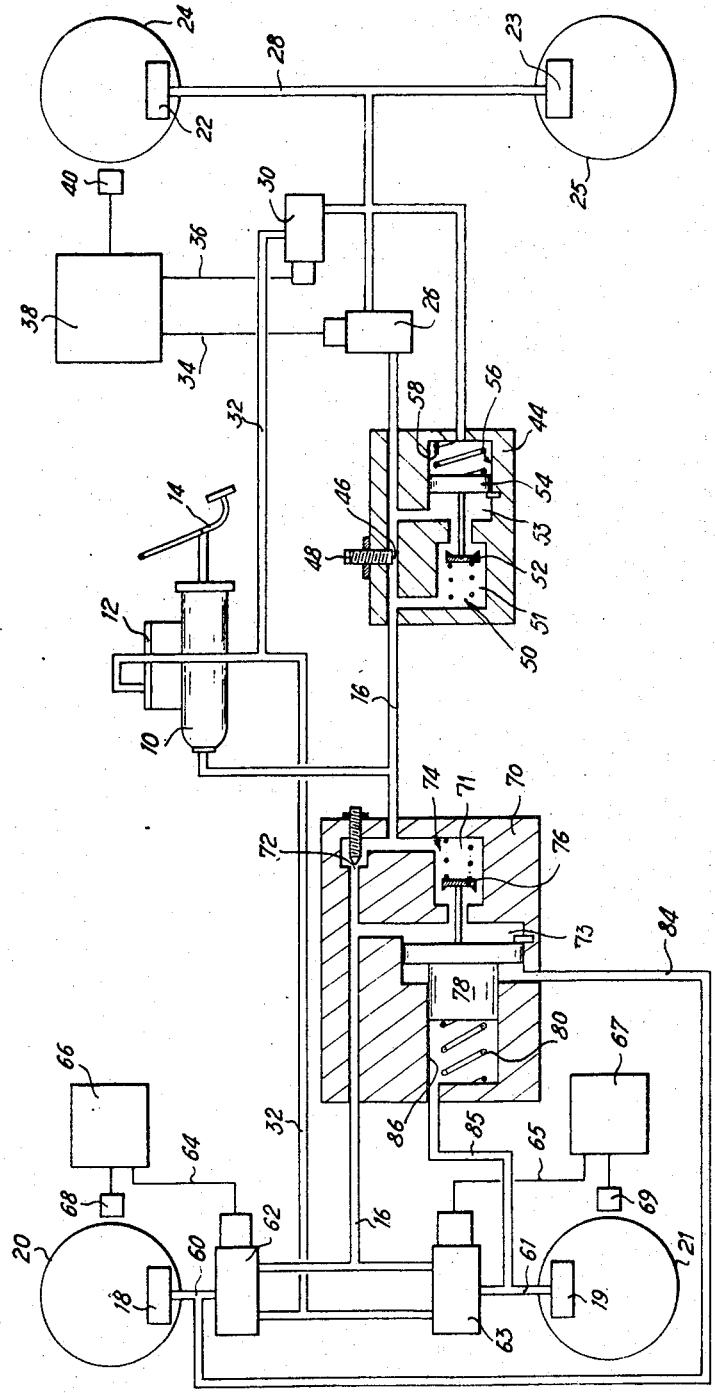

VEHICLE ANTISKID BRAKING SYSTEM

This invention relates to an antiskid braking system for automotive vehicles.

In the field of antiskid braking systems, it has already been proposed braking systems of the type in which the fluid supply connection provided between a variable fluid braking pressure control source and a set of fluid pressure actuated brake motors relating to at least one of the wheels of the vehicle is controlled by fluid pressure modulating valve means which are adapted, when actuated by output control signals generated by an antiskid control unit in response to a skidding condition of the braked vehicle, to terminate the said fluid supply connection and thereafter to connect said brake motors to a relatively low fluid pressure reservoir for preventing the above braked vehicle wheel to be locked in rotation.

However, with such prior braking systems, it has been observed that upon heavy braking operations, the number of actuations of the pressure modulating valve means as controlled by the antiskid control unit is very large and thereby involves a great consumption of braking fluid from the pressure control source. Furthermore the relatively high rate of build-up in pressure to the brake motors whenever the valve means are actuated by the antiskid control unit to re-establish the fluid supply connection results in a sudden rise in braking torque and thereby in an unpleasant sensation for the passagers of the vehicle.

The main object of the invention is to avoid the above drawbacks.

According to the invention, there is provided an antiskid braking system as defined hereinabove wherein a restricted area fluid passage is provided in said fluid supply connection between said variable pressure source and said pressure modulating valve means so as to substantially limit the fluid flow rate to said brake motors upon opening of said fluid supply connection.

With such a feature, it will be understood that the location of the restricted passage in the supply connection results in a substantial dampening effects on the build-up in the braking pressure to the brake motors and thereby in small rates of change in the braking effect. The restricted passage decreases the rate of change in the braking pressure to the brake motor and thereby the number of actuations of the modulating valve means.

According to a preferred embodiment of the invention, there is provided an anti-skid braking system as defined hereinabove which further comprises a by-pass fluid passage operatively provided in parallel fluid flow relationship with said restricted area fluid passage and controlled by a normally open by-pass valve means responsive to and actuated by the differential fluid pressure across said pressure modulating valve means for closing said by-pass passage whenever the said differential fluid pressure is above a predetermined value, as a result of an effective actuation of the fluid pressure modulating valve means in response to said skidding condition of the vehicle. Such a secondary feature permits the braking pressure to by-pass the restricted passage and thus not to be subjected to the damping effect caused thereby upon a normal braking operation wherein the modulating valve means are not requested to modulate the braking pressure to the brake motors.

One embodiment of the invention is described hereinabove by way of example with reference to the accompanying drawing in which the single FIGURE is a schematic view of a hydraulic antiskid braking system according to the invention.

When considering the braking system represented in the single FIGURE of the drawing, the reference numeral 10 designates a variable braking pressure control source such as a conventional hydraulic master cylinder, adapted to pressurize the hydraulic fluid from a reservoir 12 as a function of the operation of an input brake control pedal 14.

The output orifice of the pressure control source 10 connected by a fluid pressure supply connection 16 to two sets of fluid pressure actuated brake motors 18–19 and 22–23 of two pairs of wheels 20–21 and 24–25 respectively relating to the front and the rear axles of a vehicle (not shown).

An electrically actuated shut-off valve 26 of any known type is located between the conduit 16 and the portion 28 thereof leading to the rear axle wheel brake motors 22 and 23 so as to terminate the normal fluid communication between these motors and the control source 10. An electrically actuated normally closed exhaust valve 30 of any known type is provided between the conduit 28 and an exhaust conduit 32 leading to the reservoir 12. The electrovalves 26 and 30 are connected by wires 34 and 36 respectively to the output terminals of an antiskid control unit 38 responsive to the angular displacement of at least one of the rear axle wheels 24 or 25 by means of an angular speed sensor 40 for instance. The control unit 38 is of any known conventional type adapted to generate electrical output control signal for actuating the electrovalves 26 and 30 in response to predetermined skidding conditions as sensed by the sensor 40 of the rear axle wheels upon an heavy braking operation of the vehicle.

According to the invention, a dampening device 44 is located in the conduit 16 between the output of the control source 10 and the input of the solenoid valve 26. The device 44 mainly comprises a restricted area fluid passage or orifice 46 adapted to substantially reduce the effective flow area of the connection 16–28 and thereby the maximum possible fluid flow therethrough under normal braking pressure conditions. A setting screw 48 may be operatively provided to permit the varying of the effective fluid flow area of the orifice 46. The device 44 is further provided with a by-pass fluid passage 50 located in parallel fluid flow relationship with the orifice 46. In the shown embodiment the said passage 50 is controlled by a by-pass valve 52 defining therein two fluid chamber 51 and 53. Valve 52 is comprised of a spring loaded check valve which is normally urged in its open position by a control piston 54, sealingly slidable in a bore 56 of the device 44, and normally biased by a preloaded spring 58 in engagement with a fixed abutment of the casing device 44. The piston 54 defines within bore 56 two opposite fluid pressure chambers which are connected to the input and the output of the electrovalve 26 respectively.

The operation of the braking system described hereinabove with respect to the rear axle wheels is as follows: In normal pressure release conditions, the shut-off valve 26 is open and the exhaust valve 30 closed. Upon a normal braking actuation, the pressurized fluid flow control source 10 is supplied to rear brake motors 22 and 23 through supply connection 16, by-pass passage 50 and conduit 28 as long as the electrovalve 26 remains in its normally open position and thereby does not cause any substantial differential pressure across the piston 54.

If it is assumed now that upon a relatively heavy braking actuation, certain skidding conditions are reached in that the rear axle wheels 24 and/or 25 tend to lock, for instance, as a result of braking torque applied thereto becoming substantially higher than the maximum available friction torque. Upon this occurrence, the antiskid control unit 38 at a first stage actuates the shut-off electrovalve 26 to its closed position so as to terminate the fluid supply connection 16 between source 10 and brake motors 22 and 23 and at a second stage actuates the exhaust electrovalve 30 to its open position so as to connect the brake motors 22 and 23 to the low fluid pressure reservoir 12. The resulting rapid decrease of the pressure in the brake motors 22 and 23 permits the wheels 24 and 25 to be driven in rotation again. Once these latter have reached an angular speed substantially corresponding to the linear speed of the vehicle, the control unit 38 allows the solenoid valve 30 and thereafter the solenoid 26 to return to their normal respective positions so as to reestablish the supply connection between the conduits 16 and 28.

In order to avoid a too rapid build-up in the pressure to the brake motors 22 and 23, the dampening device 44 is provided. As a result of the above mentioned control unit operation, a substantial difference in pressure is produced across the valve 26 so that the valve 52 is biased in its closed position by piston 54 thus closing the by-pass fluid passage 50. The valve 52 is then maintained in its closed position by the bias of the differential pressure of fluid contained in chambers 51 and 53. Upon opening of the valve 26, the pressure fluid supplied by the source 10 is directed to the brake motors 22 and 23 through the orifice 46 so that the rate of the fluid flow to these motors as well as that of the pressure build-up is substantially reduced. It is to be noted that device 44 does not introduce any time and/or dampening effects on the decreased of the pressure in the conduit 28 such as controlled either by the exhaust solenoid valve 30 upon a skidding of the rear wheels or by the release of the control on the brake pedal 14.

If one considers the section of the braking system relative to the front wheels 20 and 21 one notices that each of the brake motors 18 and 19 is connected to the generaly supply conduit 16 by the intermediary of a conduit 60 or 61 and of a three-way electrovalve 62 or 63 connected by the conductors 64 or 65 to an antiskid control block 66 or 67 sensitive to the angular displacement of the corresponding wheel 20 or 21 by the intermediary for example of an angular speed detector 68 or 69. Each electrovalve 62 or 63 has a similar role to the unity of the two electrovalves 26 and 30 described above in order to reconnect the conduit 60 or 61 either to the supply conduit 16 or to the return conduit 32 to the reservoir 12 according to the electric orders sent via the conductors 64 or 65 by the antiskid control block 66 or 67.

A dampening device 70 substantially similar to the device 44 is placed in the section of the conduit 16 leading to the electrovalves 62 and 63. The device 70 is provided with an adjustable limited section orifice 72 and a by-pass passage 74 placed parallel to said orifice 72. The by-pass passage 74 consists of two chambers 71 and 73 being in fluid communication through a channel in which is disposed a valve 76 normally held in its open position by a piston 78 charged by a reinforced spring 80. Contrarily to the piston 54 of the device 44, the piston 78 is of a tiered bore 82 in which it is slidingly placed and insulated, two coaxial pressure chambers connected respectively to the conduits 60 and 61 by the conduits 84 and 85. With such a device, the control of any one of the electrovalves 62 or 63 by the corresponding antiskid control block brings on a fall in braking pressure in the corresponding brake conduit 60 or 61 so that the piston 78 is applied towards the left if one considers the drawing, by the pressure supplied by the source 10, which brings on the closure of by-pass passage 74. Then, by the bias of the differential pressure of the fluid contained in chambers 71 and 73, acting on valve 76, the passage 74 is maintained closed. Thus in the case of an unequal adherence of the two wheels 20 and 21 and of an automatic control of the braking pressure sent to the brake motors of the wheel with the weakest adherence, for example the righand wheel 20, by the corresponding antiskid control block 66, the debit of fluid under pressure sent by the source 10 to the brake motors 19 becomes substantially reduced by the actioning of the limited section orifice 72 which thus substantially slows down the speed of the rise in pressure of the brake motor 19. With such a disposition, it will be understood that the appearance of a parasite torque produced on the steering of the vehicle by the difference between the braking torques used on the two steering wheels such as wheels 20,21 will thus be dampened.

I claim:

1. In a vehicle antiskid braking system:
  operator-operated fluid pressure generating means for generating braking pressure in said system;
  brake actuating means responsive to the fluid pressure generated by said fluid pressure generating means for effecting a brake actuation;
  means communicating the fluid pressure generating means with said brake actuating means; and
  means responsive to an incipient skidding condition of a vehicle wheel and generating an output signal in response thereto;
  said communicating means including modulating means responsive to said output signal for controlling fluid communication between said pressure generating means and said brake actuating means;
  said communicating means including a restricted area passage to limit the fluid flow rate to said actuating means, bypass passage means in parallel fluid flow relationship with said restricted area passage, and normally open valve means in said bypass passage means normally permitting uninhibited fluid communication therethrough, said valve means being responsive to the fluid pressure differential across said modulating means to close said valve means when said pressure differential attains a predetermined level.

2. The invention of claim 1:
said normally open valve means including a pressure differential responsive piston for operating said normally open valve means, and resilient means yieldably urging said piston toward a position maintaining said normally open valve means open, said piston having a pair of opposed faces, one of said faces being communicated to the fluid pressure on one side of said modulating means, the other face of said piston being communicated to the fluid pressure on the other side of said modulating means.

3. The invention of claim 1:

there being a pair of said brake actuating means, each of said brake actuating means actuating a corresponding brake;

there being a pair of said modulating means, one for each of said brake actuating means;

said normally open valve means including a valve operating piston having a pair of opposed faces, said piston being controlled by the differential fluid pressures across both of the modulating means to close said bypass passage means whenever one of said differential fluid pressures is above said predetermined level.

* * * * *